US010704635B2

(12) United States Patent
Baker et al.

(10) Patent No.: US 10,704,635 B2
(45) Date of Patent: Jul. 7, 2020

(54) SPRING DEFLECTION CONTROL ASSEMBLY

(71) Applicant: Silgan Containers LLC, Woodland Hills, CA (US)

(72) Inventors: Gerald James Baker, Wauwatosa, WI (US); Jianwen Hu, Oconomowoc, WI (US)

(73) Assignee: Silgan Containers LLC, Woodland Hills, CA (US)

( * ) Notice: Subject to any disclaimer, the term of this patent is extended or adjusted under 35 U.S.C. 154(b) by 225 days.

(21) Appl. No.: 15/654,416

(22) Filed: Jul. 19, 2017

(65) Prior Publication Data

US 2018/0023651 A1 Jan. 25, 2018

Related U.S. Application Data

(60) Provisional application No. 62/364,587, filed on Jul. 20, 2016.

(51) Int. Cl.
| *F16F 1/12* | (2006.01) |
| *F16F 9/18* | (2006.01) |
| *B21D 28/00* | (2006.01) |
| *B21D 28/34* | (2006.01) |
| *B21D 24/02* | (2006.01) |
| *B21D 22/30* | (2006.01) |

(52) U.S. Cl.
CPC .............. *F16F 1/128* (2013.01); *F16F 1/122* (2013.01); *F16F 9/18* (2013.01); *B21D 22/30* (2013.01); *B21D 24/02* (2013.01); *B21D 28/002* (2013.01); *B21D 28/34* (2013.01)

(58) Field of Classification Search
CPC ... F16F 1/122; F16F 1/128; F16F 9/18; B21D 22/30; B21D 22/20; B21D 24/02; B21D 24/005; B21D 28/002; B21D 28/34; B21D 51/26; B21D 51/383; B65D 1/165; F15B 15/262; F16D 1/096
USPC .............. 267/119; 83/588, 552, 691; 188/67, 188/170; 91/41
See application file for complete search history.

(56) References Cited

U.S. PATENT DOCUMENTS

| 3,586,138 A | * | 6/1971 | Engle ...................... B60T 17/16 188/265 |
| 5,302,062 A | * | 4/1994 | Baba ....................... F16D 1/091 409/231 |
| 5,540,135 A | * | 7/1996 | Goellner ............... F15B 15/262 91/41 |

(Continued)

*Primary Examiner* — Robert A. Siconolfi
*Assistant Examiner* — San M Aung
(74) *Attorney, Agent, or Firm* — Reinhart Boerner Van Deuren s.c.

(57) ABSTRACT

A spring assembly is provided which decreases the fatigue and wear on the springs of the assembly. The spring assembly includes upper and lower pistons separated by a substantially incompressible fluid. The lower piston is attached to one or more springs. The surface area of the upper surface of the lower piston is greater than the surface area of the lower surface of the upper piston. As such, the springs are deflected by a distance less than the distance traveled by the upper piston. By decreasing the length the springs are compressed, the springs are subject to less fatigue and wear. As a result, the life span of the springs is increased and the maintenance required of the spring assembly is minimized relative to that of typical spring assemblies.

17 Claims, 7 Drawing Sheets

(56) References Cited

U.S. PATENT DOCUMENTS

| | | | | |
|---|---|---|---|---|
| 5,626,048 A | * | 5/1997 | McClung | B21D 22/22 |
| | | | | 72/336 |
| 6,152,268 A | * | 11/2000 | Goellner | F15B 15/262 |
| | | | | 188/170 |
| 2003/0077192 A1 | * | 4/2003 | Shin | F04B 35/045 |
| | | | | 417/488 |
| 2008/0276783 A1 | * | 11/2008 | Komiya | B21D 28/125 |
| | | | | 83/691 |
| 2017/0095852 A1 | | 4/2017 | Carstens et al. | |

* cited by examiner

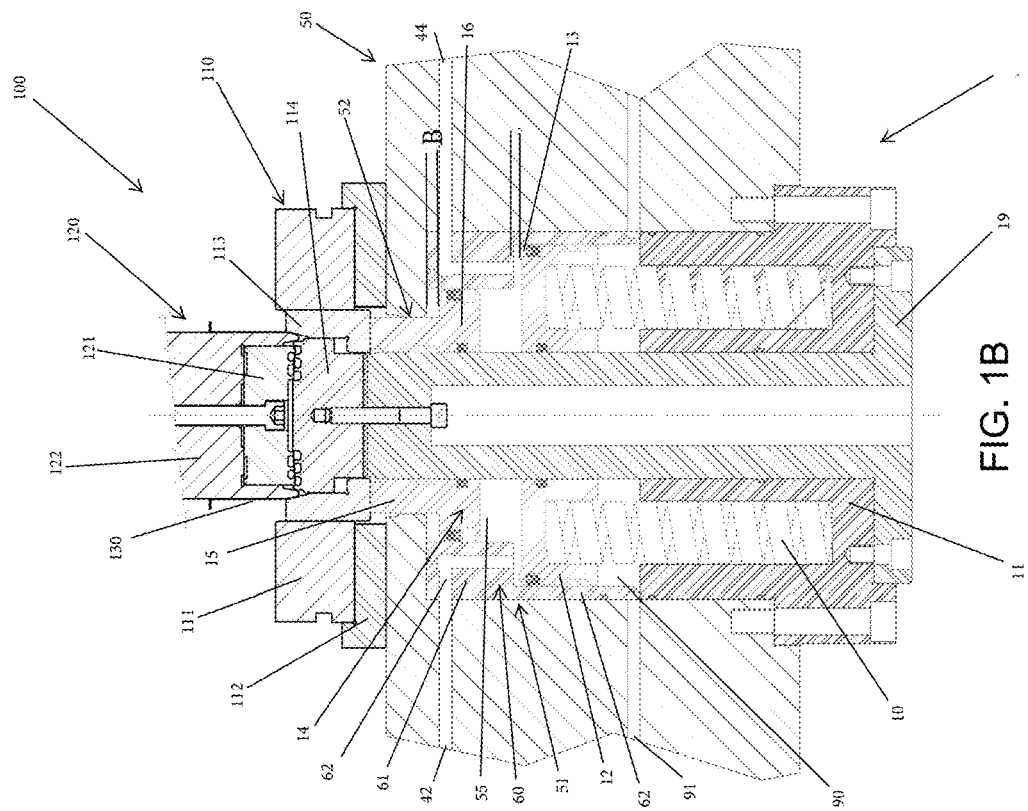
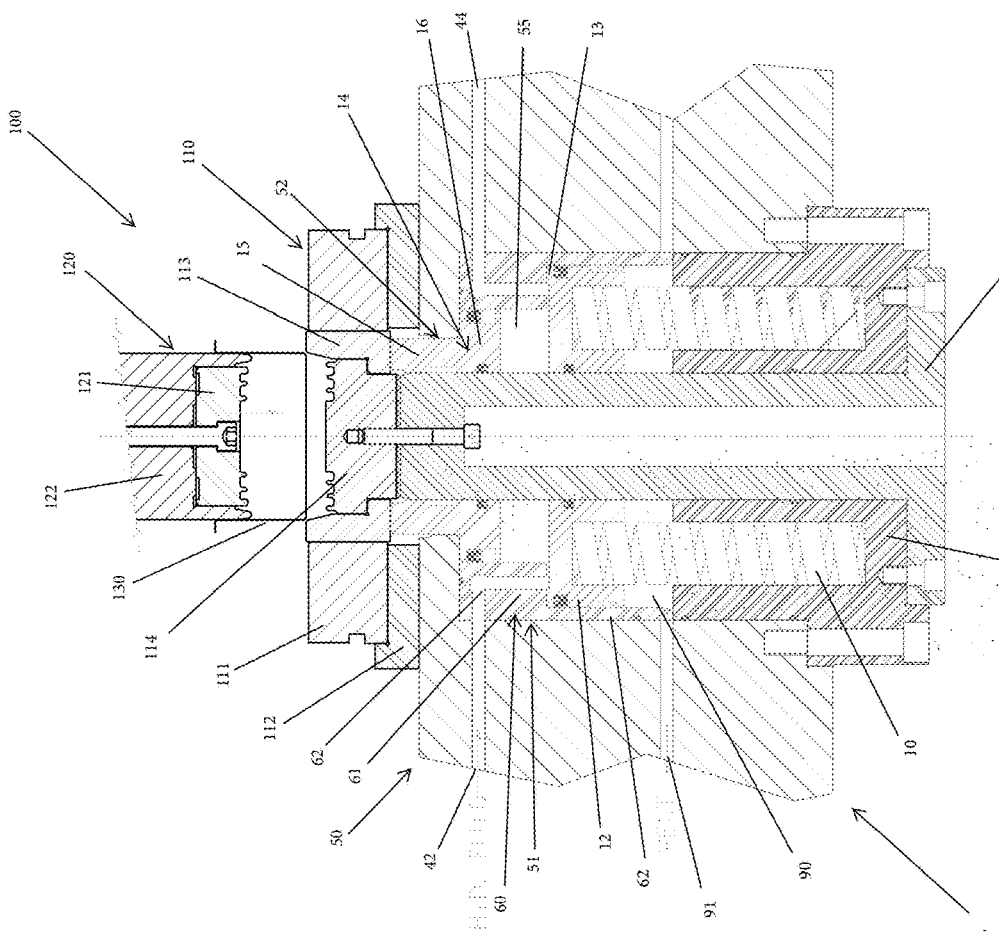
FIG. 1A
FIG. 1B

FIG. 3B

SPRING DEFLECTION CONTROL ASSEMBLY

CROSS-REFERENCE TO RELATED PATENT APPLICATION

This application claims the benefit of and priority to U.S. Provisional Patent Application No. 62/364,587 filed on Jul. 20, 2016, which is incorporated herein by reference in its entirety.

BACKGROUND OF THE INVENTION

During operation of a press assembly, one or more springs may be utilized to provide a controlled return pressure to a punch to return the punch to its starting position at the end of a stroke. Referring generally to the figures, various embodiments of a spring assembly enhancing the life of the springs and thereby minimizing maintenance and costs are described.

When press assemblies are operated, the force, rate, and frequency at which the press assembly is run often results in spring fatigue, with some or all of the springs fracturing or failing. In such situations, running of the press assembly has to be halted and production must be stopped so that the press assembly can be disassembled and the springs replaced.

In order to minimize the disruption to the operation of the press assembly, which can be costly owing to the down time required to replace the springs, in some press assemblies special, custom ordered springs may be utilized. Such custom order springs may have a longer lifespan than standard, commercial springs. However, such custom springs are often significantly more expensive that standard springs, and may be difficult to replace once the springs are worn.

Described herein is a spring assembly configured to minimize the compression and deflection of springs during operation of a press or other assembly, and thereby decrease the fatigue, stress, and wear on the springs and the maintenance required and costs involved in upkeep of the spring assembly.

SUMMARY OF THE INVENTION

In one embodiment, a spring assembly includes a housing having an internal cavity and an exterior. At least one spring is located within a lower portion of the cavity of the housing. A bottom end of the at least one spring is supported by the housing.

A first piston is attached to a top end of the at least one spring. The first piston is configured to provide a fluid tight seal between an upper portion of the cavity and the lower portion of the cavity.

A second piston is located within the upper portion of the cavity and extends through an upper opening in the housing. The upper piston is configured to provide a fluid tight seal between the upper opening and the cavity.

A volume of substantially incompressible fluid is located between the upper surface of the first piston and a lower surface of the second piston. The surface area of the first piston is greater than the surface area of the second piston. A channel is configured to provide fluid communication between the fluid and the exterior.

In one embodiment, a method for reducing spring fatigue includes providing a spring assembly. The spring assembly includes a housing. A spring is located within the housing. A first piston is attached to a top end of the spring. A second piston is located within and extends through the housing. A space is defined between an upper surface of the first piston and a lower surface of the second piston.

The space is filled with a substantially incompressible fluid. The second piston is displaced by a first distance. The displacement of the second piston causes the first piston to travel a second distance. The second distance is less than the first distance.

In one embodiment, a spring assembly includes a housing. A first piston is located within the housing and has a lower surface with a first surface area. A second piston is located within the housing and has an upper surface with a second surface area greater than the first surface area.

The upper surface of the second piston is spaced apart from and faces the lower surface of the first piston. A spring is attached to a lower surface of the second piston. A substantially incompressible fluid fills the space defined between the lower surface of the first piston and the upper surface of the second piston.

BRIEF DESCRIPTION OF THE DRAWINGS

This application will become more fully understood from the following detailed description, taken in conjunction with the accompanying figures, wherein like reference numerals refer to like elements in which:

FIG. 1A shows a spring assembly in an initial or rest position attached to a representative press assembly according to an exemplary embodiment;

FIG. 1B shows the spring and press assembly of FIG. 1A during use according to an exemplary embodiment;

FIG. 3B shows the spring and press assembly of FIG. 3A during use according to an exemplary embodiment;

SPECIFICATION

Figure 2A:
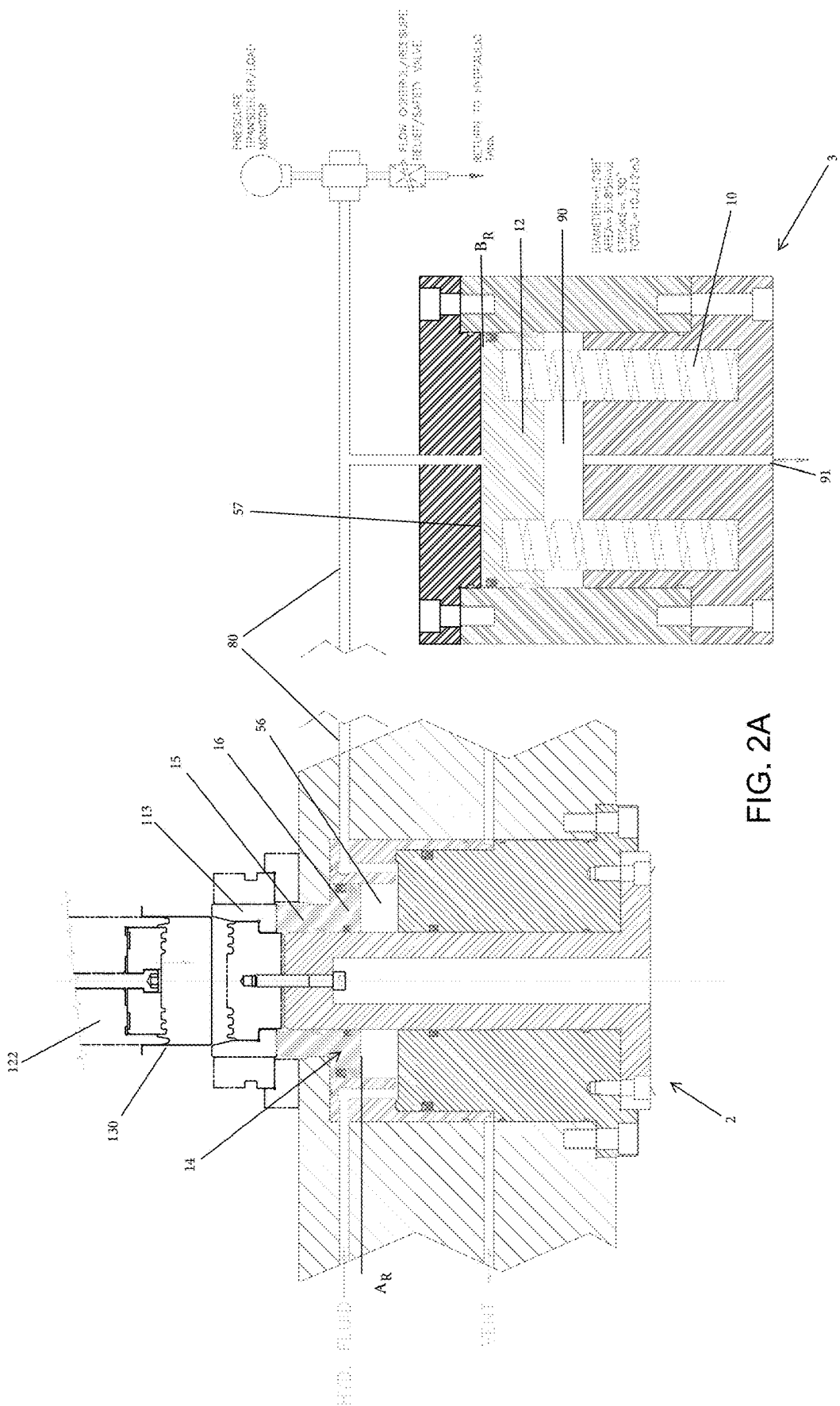
FIG. 2A shows a spring assembly in an initial or rest position attached to a representative press assembly according to an exemplary embodiment.

Shown in FIGS. 1A and 1B is one embodiment of a reduced maintenance spring assembly 1 configured to extend the lifespan of springs 10. Spring assembly 1 includes a housing 50 having a housing cavity 51 in which one or more springs 10 are supported. The lower ends of springs 10 may be positioned within one or more sleeves 11 which are spaced about and attached to a riser 19 extending through housing 50.

Attached at the upper end of springs 10 is lower piston 12. The inner circumference of lower piston 12 surrounds the outer surface of riser 19. In some embodiments, the outer circumference of lower piston 12 is surrounded by an inner surface of housing 50. As shown in FIGS. 1A and 1B, in some embodiments the outer circumference of lower piston 12 is surrounded by an inner surface of flow inset 60 (discussed in detail below). Lower piston 12 may include one or more seals (e.g. O-rings, oil seals, lip seals, etc.) to provide a fluid tight seal between lower piston 12 and the other components of spring assembly 1.

Positioned within upper opening 52 of housing cavity 51 is upper piston 14 having stem portion 15 and head portion 16. As illustrated in the embodiment of FIGS. 1A and 1B, the diameter of stem portion 15 is less than the diameter of head portion 16. The increased diameter of head portion 16 relative to stem portion 15 limits the upward travel of upper piston 14 during operation of the press assembly 100 and/or spring assembly 1.

The inner circumference of upper piston 14 surrounds the outer surface of riser 19 and a seal is located between piston 14 and riser 19 to prevent fluid flow from cavity 55. At least a portion of the outer circumference of stem portion 15 is surrounded by the inner surface of upper opening 52 of housing cavity 51. In some embodiments, the outer circumference of head portion 16 is surrounded by an inner surface of housing 50. As shown in FIGS. 1A and 1B, the outer circumference of head portion 16 is surrounded by an inner surface of flow inset 60 (discussed in detail below). Upper piston 14 may include one or more seals (e.g. O-rings, oil seals, lip seals, etc.) located on the stem portion 15 and/or the head portion 16 to provide a fluid tight seal between upper piston 14 and the other components of spring assembly 1.

Extending through housing 50 and in fluid communication with a cavity 55 extending between the lower surface of upper piston 14 and the upper surface of lower piston 12 are one or more inflow passageways 42 and one or more outflow passageways 44. In some embodiments, inflow passageway 42 and outflow passageway 44 may be in direct fluid communication with cavity 55. In other embodiments, such as shown in FIGS. 1A and 1B, a flow inset 60 having two or more channels 62 may be located within housing cavity 51, such that inflow passageway 42 and outflow passageway 44 are in fluid communication with cavity 55 via channels 62 of flow inset 60.

The upper surface of lower piston 12 may include a raised protrusion 13. In embodiments where a flow inset 60 is used, such as shown in FIGS. 1A and 1B, raised protrusion 13 provides a clearance between the upper surface of piston 12 and a bottom surface of flow inset 60. As such, even when spring assembly 1 is in a rest phase, such as shown in FIG. 1A and the lower piston 12 is at its most elevated position, channels 62 remain unoccluded and allow for fluid flow into cavity 55.

Prior to initial use, fluid from a reservoir (not shown) is introduced into cavity 55 through inflow passageway 42. Any substantially incompressible fluid, such as hydraulic fluid, may be used. Alternatively, in some embodiments a slightly compressible fluid, e.g. a fluid having a minimal amount of entrained air (e.g. 1%) may be used. In such embodiments, the slightly compressible fluid may be used to dampen the dynamic shock imparted on the spring assembly 1 during operation.

In some embodiments, cavity 55 may initially be primed with a quantity of fluid such that the initial starting pressure within cavity 55 is between 50 and 100 psi, so that upper piston 14 is initially biased towards its upmost position, such as shown in FIG. 1A.

Similarly, prior to initial use, lower cavity 90 between the lower surface of lower piston 12 and the housing 50 may be primed with an initial amount of a compressible substance (e.g. a compressible fluid, air or other gas, a gel or other semi-solid, etc.) so that in an initial or rest position, spring 10 is in a neutral (i.e. unexpanded and uncompressed) state. One or more vents or passageways 91 may be provided within housing 50 which allow for fluid communication between and exterior of the spring assembly 1 and space 90, through which the pressure within lower cavity 90 may be adjusted as required.

Located in the inflow passageway 42 may be one or more valves, such as check valves, which allow fluid to flow in to cavity 55, but which prevent fluid from flowing out from cavity 55. Located in the outflow passageway 44 may be one or more pressure transducers or monitors and/or one or more flow control or safety valves which allow fluid to flow out of cavity 55 if the pressure within cavity 55 becomes too great. Similar valves and/or pressure monitors may be incorporated into passageways 91 to monitor and control the pressure of space 90.

Referring to FIGS. 1A and 1B, operation of the spring assembly 1 in combination with a representative press assembly 100 will be described. It is to be understood that the press assembly 100 shown and described is for representative purposes only. As will be understood by one skilled in the art, the spring assembly 1 may be used, or may be modified to be used, with any number of presses or other similar assemblies.

The representative press assembly 100 shown in FIGS. 1A and 1B includes a lower portion 110 having an annular sleeve 111 supported atop a spacer 112. Located within annular sleeve 111 are one or more pads 113 on which a lower die 114 initially rests. Spacer 112 rests on the upper surface of housing 50, and the bottom surface of pad 113 rests on the stem portion 15 of upper piston 14. The press assembly 100 may be coupled to the spring assembly 1 by an attachment between lower die 114 and riser 19.

Press assembly 100 also includes an upper portion 120 having an upper die 121 coupled to a punch 122. A clamp (not shown) is located between lower assembly 110 and upper assembly 120 and is used to hold an object 130 being worked upon (e.g. metal sheets, a can body, etc.).

During operation of the press assembly 100, upper portion 120 is pushed down onto lower portion 110. Although lower portion 110 remains stationary, as upper portion 120 travels downward, punch 122 engages pad 113, causing pad 113 to travel downwards. Pad 113, which rest on top of spring assembly 1, in turn imparts a downward force on to upper piston 14, causing upper piston 14 to be displaced.

In typical spring assemblies, as briefly described previously, upper piston 14 is directly attached to springs 10. Thus, in typical spring assemblies, the distance springs 10 are compressed as a result of the downward movement of punch 122 is substantially the same as the distance by which the upper piston 14 is displaced by punch 122. In contrast, as illustrated in FIG. 1B, the displacement of springs 10 of spring assembly 1 is less than the distance travelled by upper piston 14.

As shown in FIGS. 1A and 1B, the surface area of the lower surface of head portion 16 of upper piston 14 is less than the surface area of the upper surface of lower piston 12. As punch is 122 is lowered, force is transmitted from punch 122 through pad 113 and into the stem portion 15 and head portion 16 of upper piston 14. As the fluid in cavity 55 is a substantially incompressible fluid, the increased pressure acting on the fluid as a result of the force imparted by upper piston 14 is equal to the pressure exerted by the fluid on the lower piston 12. Because the surface area of the lower piston 12 is greater than the surface area of head portion 16 of upper piston 14, the pressure of the fluid acting on the larger surface area of the lower piston 12 imparts a force onto the lower piston 12 that is greater than the force acting on upper piston 14.

As a result of the greater force acting on lower piston 12, a greater force is exerted on spring 10 than would be if the spring 10 were directly attached to upper piston (such as in previous spring assemblies). Owing to the greater force exerted on spring 10, the distance A spring 10 is compressed is less than the distance B travelled by the upper piston 14, and in turn less than the distance spring 10 would be compressed in a typical spring assembly. In other words, the energy transferred to the fluid from upper piston 14 is equal (less friction losses such as heat loss to the fluid) to the energy transferred from the fluid to lower piston 12. The force on piston 14 (pressure×area) is lower, but the travel distance is greater, whereas the force on piston 12 (pressure× area) is higher, but the travel distance is lower. Because spring fatigue and failure is negatively correlated to spring deflection and/or compression, the lower compression travel of spring 10 as compared to a typical spring assembly results in lower spring fatigue even though the travel distance of upper piston 14 does not change.

The ratio of the surface areas of pistons 12 and 14 are inversely proportional to the distance of travel. For example, if the area of piston 12 is twice as large as the area of piston 14, piston 12 will travel half the distance of piston 12 and thus reduce the distance of spring compression for a given force on piston 14. Depending upon the particular application and/or use of the associated press, the ratios between the surface areas of the pistons would be tailored to the particular press and operation being performed by the press.

To that effect, the incorporation of flow inset 60 allows for easy adjustment and modification of the ratios between the surface areas of the upper piston 14 and lower piston 12. As shown in FIGS. 1A and 1B, flow inset 60 includes an upper reduced diameter portion 61 and a lower large diameter portion 62. The reduced diameter portion 61 is sized such that it substantially matches the outer diameter of head portion 16 of upper piston 14 and such that the large diameter portion 62 substantially matches the outer diameter of lower piston 12. In some embodiments (not shown), flow inset 60 only includes reduced diameter portion 62, such that the outer surface of lower piston 12 is surrounded by the inner wall of housing 50 and only the outer surface of head portion 16 of upper piston 14 is surrounded by the inner surface of the flow inset 60.

Thus, if it were desired to change or adjust the ratio between the upper piston 14 and the lower piston 12, it would be possible to do so without significant restructuring of the spring assembly 1. Depending on the ratio desired, it would be sufficient to replace the upper piston 14 and/or the lower piston 12 with an upper piston 14 and/or lower piston 12 having a different diameter/surface area, and replace flow inset 60 with a replacement flow inset 60 having inner dimensions sized according to the replacement upper piston 14 and/or lower piston 12, while retaining the remaining components of the spring assembly 1.

Figure 2B:
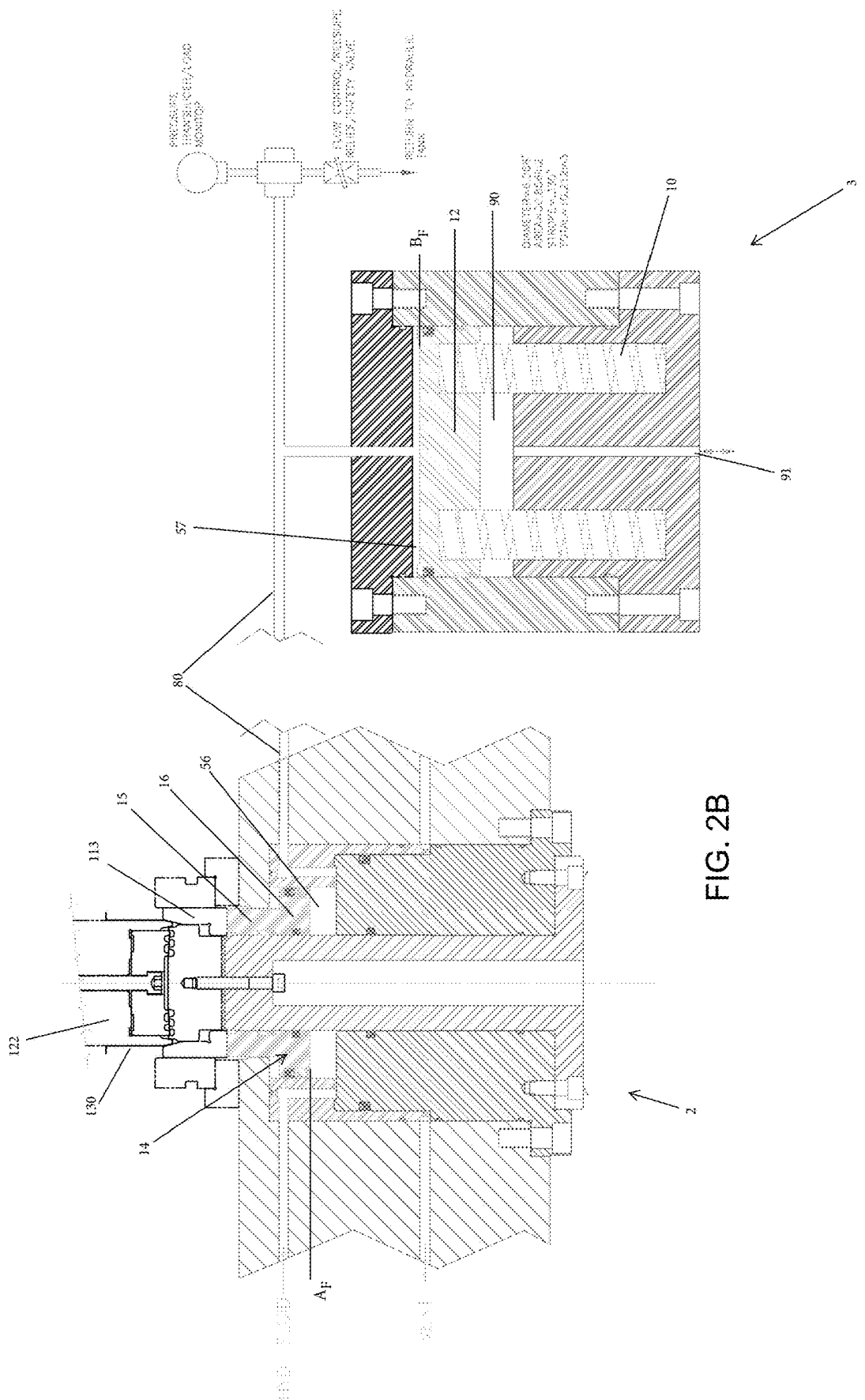
FIG. 2B shows the spring and press assembly of FIG. 2A during use according to an exemplary embodiment.

Illustrated in FIGS. 2A and 2B is another embodiment of a spring assembly 1 which simplifies maintenance and upkeep. The spring assembly 1 of the embodiment of FIGS. 2A and 2B is generally similar to the spring assembly 1 as shown in FIGS. 1A and 1B. However, whereas the spring assembly 1 of FIGS. 1A and 1B is integrated into a single unit, spring assembly 1 of FIGS. 2A and 2B is assembled into a primary unit 2 and a remote spring unit 3.

As illustrated in FIGS. 2A and 2B, instead of a single fluid filled cavity 55 being directly positioned between the lower surface of upper piston 14 and the upper surface of lower piston 12, in the embodiment shown in FIGS. 2A and 2B, a first space 56 located within primary unit is connected to a second space 57 located within remote spring unit 3 by flow conduit 80. However, despite this modified fluid arrangement extending between the lower surface of upper piston 14 and the upper surface of lower piston 12, the resultant effect of the spring assembly 1 of the embodiment of FIGS. 2A and 2B is similar to that of the spring assembly 1 of the embodiment of FIGS. 1A and 1B such that the arrangement shown in FIGS. 2A and 2B also increases the ease and efficiency of maintaining and repairing spring assembly 1 as a result of decreased spring 10 wear and fatigue.

Moreover, the multi-unit spring assembly 1 shown in FIGS. 2A and 2B allows for minimal disruption to the operation of press or other assembly 100 in the event that maintenance and/or repair of springs 10 of spring assembly 1 is required. In the event that a spring 10 needs to be replaced, remote spring unit 3 can be disconnected from flow conduit 80, and a replacement spring unit 3 can be immediately reconnected to primary unit 2. In such a manner, the down-time of the press or other assembly 100 is limited only by the amount of time required to disconnect and reconnect the worn and replacement remote spring units 3. Any time-consuming inspection, repair, and/or replacement of the springs 10 of the remote spring unit 3 can subsequently be performed after the press or other assembly 100 is back in operation, thereby minimizing the down-time of the running of the press or other assembly 100.

During operation of press assembly shown in FIGS. 2A and 2B, as the upper portion 120 of press assembly 100 is lowered, force is transmitted through punch 122 into upper piston 14, forcing upper piston 14 to travel downwards a distance from an initial position $A_R$ shown in FIG. 2A to a displaced position $A_F$ shown in FIG. 2B. As upper piston 14 is displaced downwards, fluid located within the first space 56 is forced into flow conduit 80 and into second space 57. Because the pressure of the fluid within first space 56, flow conduit 80 and second space 57 is transmitted equally by the fluid, the pressure exerted by the upper piston 14 on the fluid is transferred onto the upper surface of lower piston 12. Based on the same principle described above, because the surface area of the upper surface of lower piston 12 is greater than the surface area of the lower surface of piston 12, the resultant force on the lower piston 12 is greater than the force exerted on the upper piston 14. As such, the distance travelled by the lower piston from an initial position $B_R$ shown in FIG. 2A to a displaced position $B_F$ shown in FIG. 2B is less than the distance traveled by the upper piston 14. Thus, by decreasing the deflection of the springs 10, the embodiment of the spring assembly 1 of FIGS. 2A and 2B also serves to prolong the life of springs 10 and thereby reduce the maintenance required of spring assembly 1.

Figure 3A:
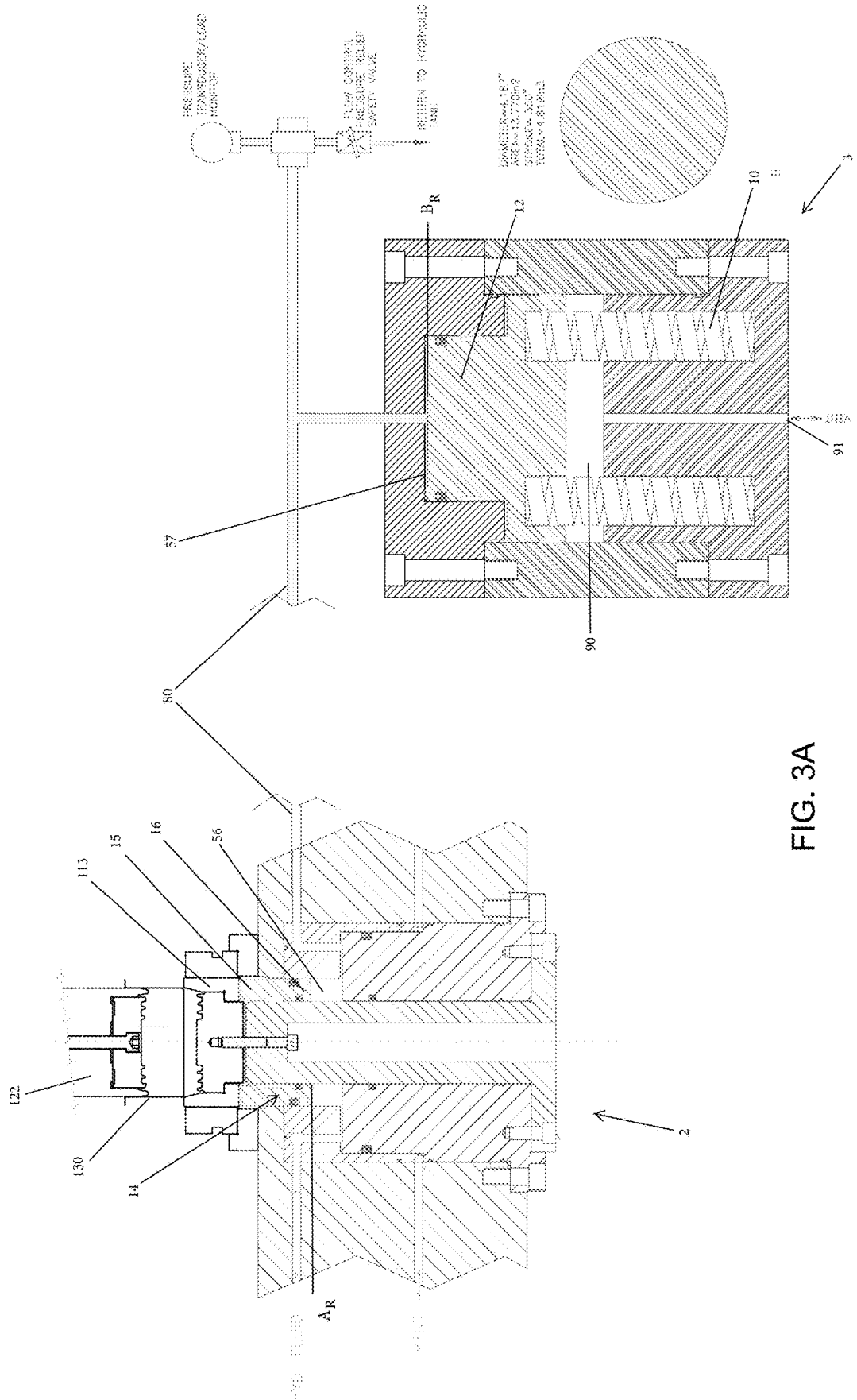
FIG. 3A shows a spring assembly in an initial or rest position attached to a representative press assembly according to an exemplary embodiment.
Figure 3B:
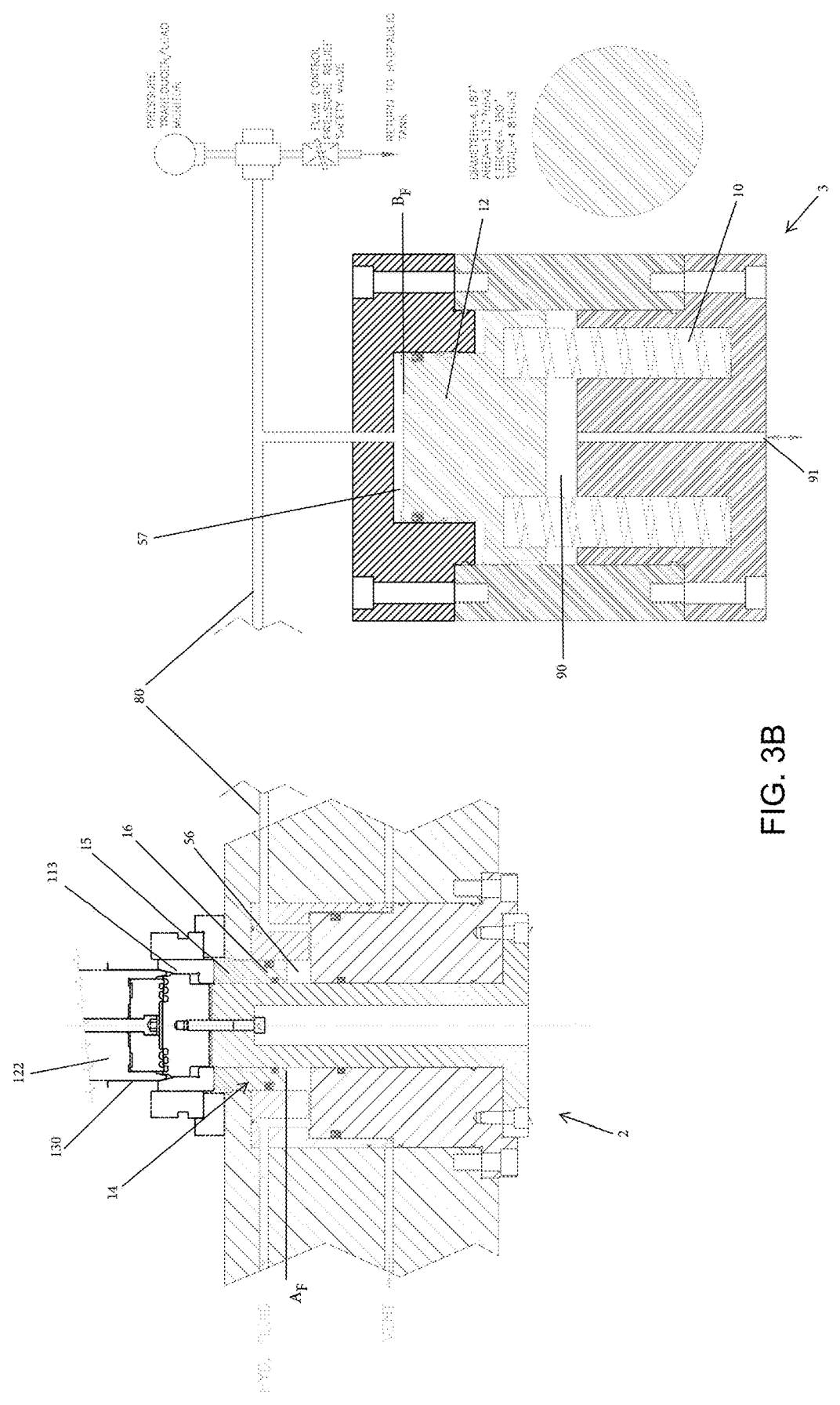

Illustrated in FIGS. 3A and 3B is another embodiment of a spring assembly 1 requiring reduced maintenance and upkeep. The multi-unit spring assembly 1 of the embodiment of FIGS. 3A and 3B is generally similar to the multi-unit spring assembly 1 shown in FIGS. 2A and 2B. As shown in FIGS. 3A and 3B, the main difference between these embodiments is the size of the head portion 16 of the upper piston 14 and the size of the surface area of the upper surface of the lower piston 12.

In the embodiment shown in FIGS. 3A and 3B, the dimension of head portion 16 is generally the same as the dimension of stem portion 15. Additionally, the dimensions of head portion 16 and stem portion 15 are generally equal to the dimension of upper opening 52 of housing cavity 51. Because the dimensions of the upper piston 14 are generally the same as the dimension of upper opening 52, upper piston 14 and the seals used with upper piston 14 may be removed from housing 50 without requiring complete disassembly of the housing 50 and/or disassembly of the spring assembly 1 from the press assembly 100, allowing for easier maintenance/repair of the spring assembly 1.

As also shown in FIGS. 3A and 3B, because the surface area of the lower surface of upper piston 14 is reduced as compared to the surface area of the lower surface of the upper piston 14 in the embodiments shown in FIGS. 1A and 2A, as shown in FIGS. 3A and 3B the surface area of the upper surface of lower piston 12 is similarly reduced. However, as described previously, depending on the ratio of surface area of the upper piston 14 to the surface area of the lower piston 12 desired, the dimensions of the lower piston 12 may be modified from those depicted in FIGS. 3A and 3B.

Although the reduced dimension head portion 16 and reduced diameter lower piston 12 shown in FIGS. 3A and 3B are shown incorporated into a multi-unit spring assembly 1, it should be understood that the single unit spring assembly 1 illustrated in FIGS. 1A and 1B could be similarly modified with such decreased head portion 16 and lower piston 12 dimensions.

Figure 4:
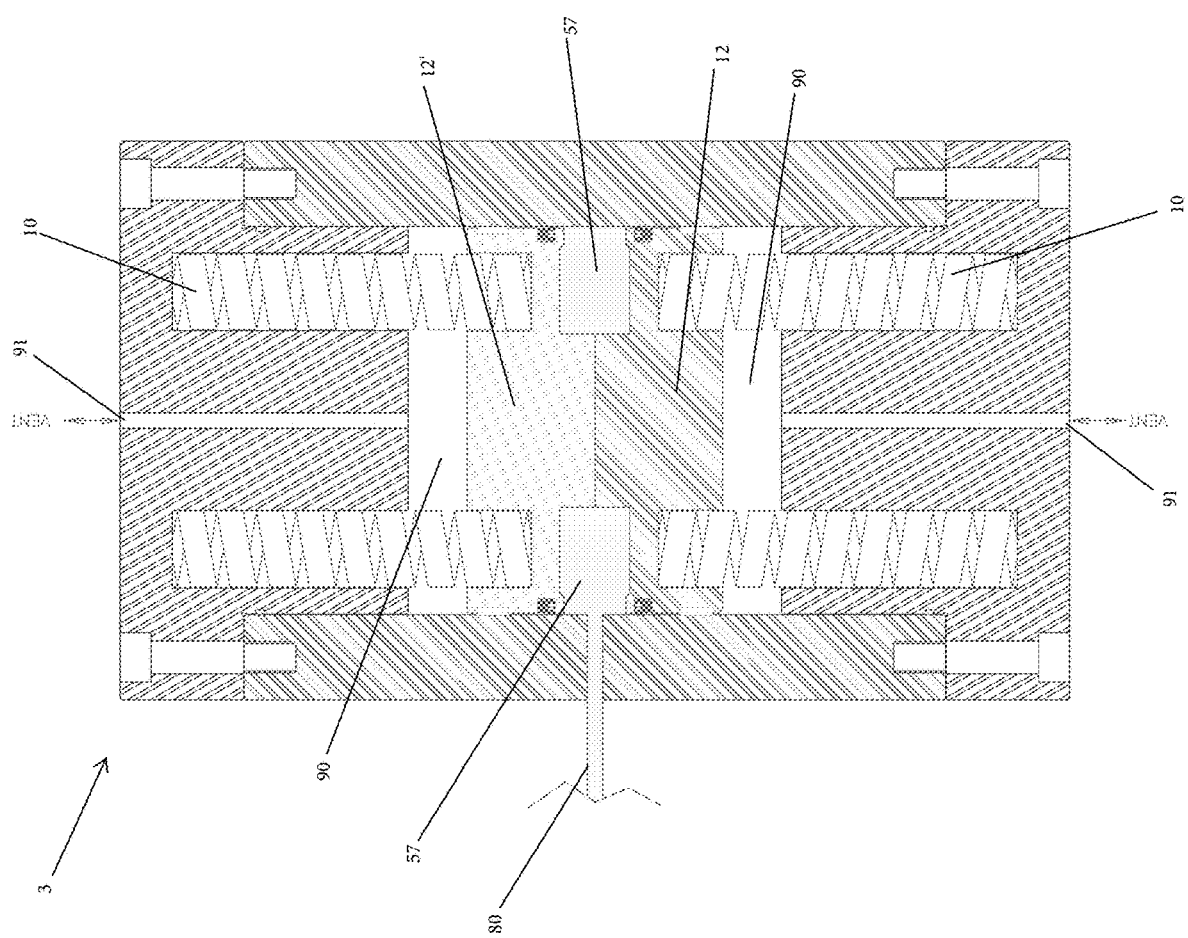
FIG. 4 shows a remote spring unit of a spring assembly in an initial or rest position according to an exemplary embodiment.

Shown in FIG. 4 is another embodiment of a remote spring unit 3 that may be used with spring assembly 1. In such an embodiment, the deflection of springs 10 is further minimized by the incorporation of an additional lower piston 12'. With the incorporation of a second lower piston 12', the surface area over which pressure exerted by the fluid is increased, which in turn further reduces the travel amount of springs 10, and thereby decreases the deflection of the springs 10. As shown in FIG. 4, in such a double lower piston 12, 12' arrangement, the lower pistons 12, 12' are arranged in a back-to-back manner. The heads of the lower pistons 12, 12' are structured so as to define a second space 57 into which fluid from the first space 56 and the flow conduit 80 may flow into. During operation of the press or other assembly 100, as fluid begins to flow into second space 57, the fluid displaces the lower pistons 12, 12' such that lower piston 12 travels downwards and lower piston 12' is displaced upwards.

Figure 5:
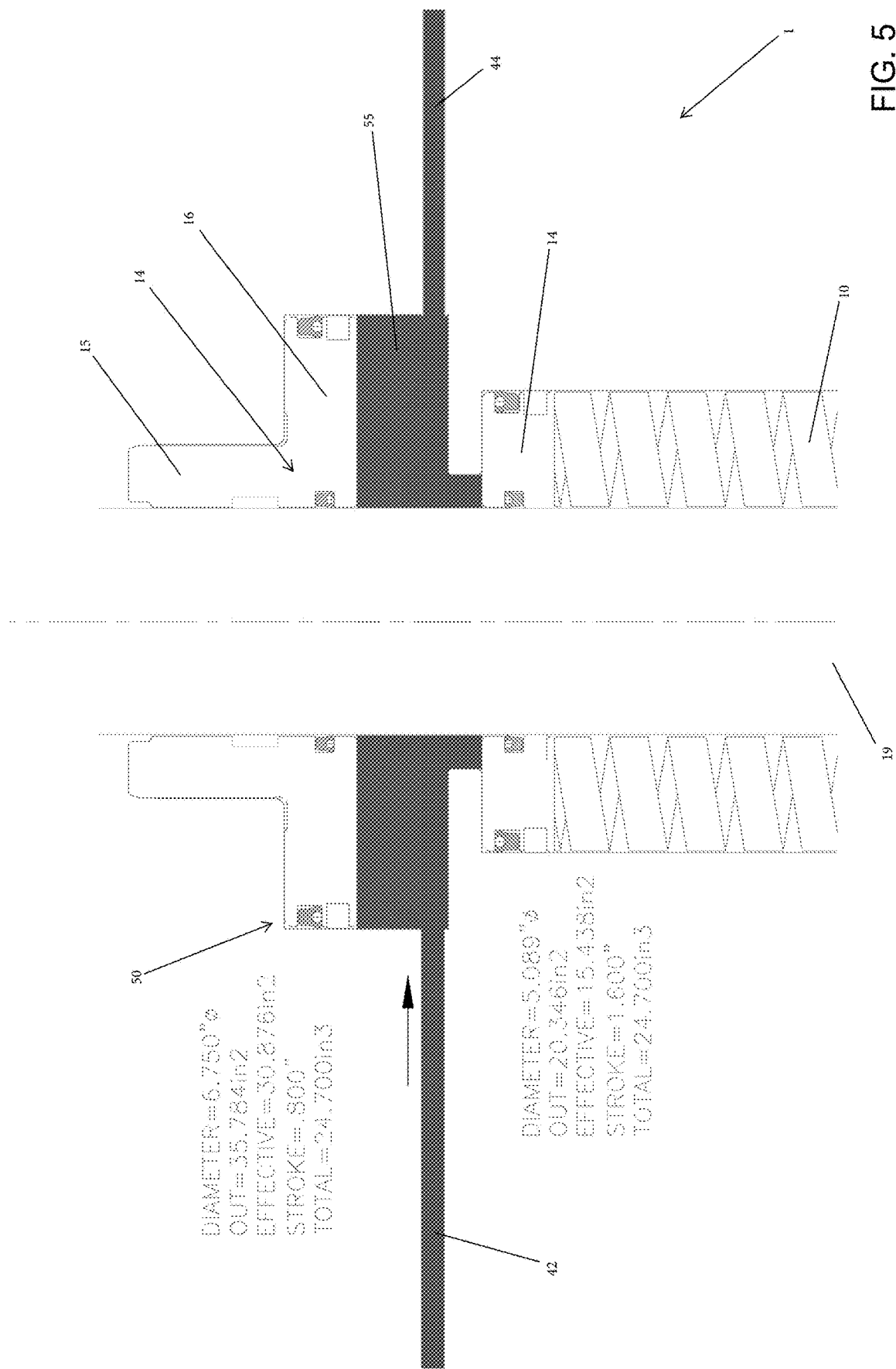
FIG. 5 shows a spring assembly according to another exemplary embodiment.

Referring to FIG. 5, in yet another embodiment of a spring assembly 1 which simplifies maintenance and upkeep, spring assembly 1 also includes an upper piston 14 and lower piston 12 in a manner configured to reduce wear, stress and fatigue of springs 10. In the embodiments previously described, upper piston 14 has a smaller surface area than lower piston 12, thereby minimizing the distance travelled by lower piston 12 and spring 10 as compared to the distance travelled by upper piston 14.

In contrast, in this alternate embodiment shown in FIG. 5, the surface area of upper piston 14 is greater than lower piston 12. Given that the force imparted on to lower piston 12 is proportional to the ratio of the area of the lower piston 12 to the area of the upper piston 14, the force imparted on lower piston 12 (having a smaller area relative to upper piston 14) and spring 10 will be less than the force imparted by press or other assembly 100 on upper piston 14.

Although in this alternate embodiment the deflection of spring 10 is greater than the distance travelled by upper piston 14, because spring 10 is subject to less force than it would be in a typical spring assembly, spring 10 is subject to less stress and fatigue, thereby minimizing spring failure and decreasing maintenance requirements. Such an arrangement as described in this alternate embodiment and shown in FIG. 5 in which upper piston 14 has a surface area greater than lower piston 12 may be useful, e.g., in situations in which minimizing the footprint of the spring assembly 1 is desired, as the lower portion of spring assembly 1 in which springs 10 and lower piston 12 are housed has a smaller dimension (and therefore takes up less space) than a typical spring assembly.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

For purposes of this disclosure, the term "coupled" or "attached to" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. It should also be understood that the terminology is for the purpose of description only and should not be regarded as limiting.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above in the implementation of the teachings of the present disclosure.

We claim:

1. A spring assembly comprising:
    a housing having a first unit and a separate second unit, the housing having an internal cavity and an exterior;

at least one spring located within a lower portion of the cavity of the housing, a bottom end of the at least one spring supported by the housing;

a first piston attached to a top end of the at least one spring, the first piston configured to provide a fluid tight seal between an upper portion of the cavity and the lower portion of the cavity;

a second piston, the second piston located within the upper portion of the cavity and extending through an upper opening in the housing, the second piston configured to provide a fluid tight seal between the upper opening and the cavity;

a volume of substantially incompressible fluid located between an upper surface of the first piston and a lower surface of the second piston, a surface area of the first piston being greater than a surface area of the second piston;

a channel configured to provide fluid communication between the fluid and the housing exterior;

a space between the upper surface of the first piston and the lower surface of the second piston, wherein an initial pressure in the space is between 50 psi and 100 psi; and a conduit connecting the space defined between the lower surface of the first piston and the first unit to a space defined between the second unit and the upper surface of the second piston.

2. The spring assembly of claim 1, wherein the surface area of the first piston is twice as large as the surface area of the second piston.

3. The spring assembly of claim 1, wherein second piston includes an upper portion and a lower portion, an outer diameter of the lower portion being greater than an outer diameter of the upper portion.

4. A method for reducing spring fatigue comprising:
providing a spring assembly comprising:
a housing;
a spring located within the housing;
a first piston attached to a top end of the spring;
a second piston located within and extending through the housing; and
a space defined between an upper surface of the first piston and a lower surface of the second piston;
filling the space with a substantially incompressible fluid; and
displacing the second piston by a first distance, the displacement of the second piston causing the first piston to travel a second distance, wherein the second distance is less than the first distance.

5. The method of claim 4, wherein the space is initially pressurized between 50 and 100 psi.

6. The method of claim 4, wherein a surface area of the first piston is at least two times a surface area of the second piston.

7. The method of claim 4, wherein the second distance is no more than half the first distance.

8. The method of claim 4, wherein the housing comprises a first unit and a separate second unit; the first piston located within the first unit and the second piston located within the second unit.

9. The method of claim 8, further comprising a conduit fluidly connecting a space defined between the upper surface of the first piston and the first unit to a space defined between the second unit and the lower surface of the second piston.

10. The method of claim 9 further comprising a third piston and a second spring, the third piston and the second spring each located within the first unit.

11. The method of claim 10, wherein a lower surface of the third piston is spaced apart from and faces the upper surface of the first piston; the fluid filling the space defined between the lower surface of the third piston and the upper surface of the first piston.

12. The method of claim 11, wherein the second spring is attached to an upper surface of the third piston.

13. A spring assembly comprising:
a housing comprising a first unit and a separate second unit;
a first piston located within the first unit of the housing and having a lower surface with a first surface area;
a second piston located within the second unit of the housing and having an upper surface with a second surface area greater than the first surface area, the upper surface of the second piston is spaced apart from and facing the lower surface of the first piston;
a spring attached to a lower surface of the second piston;
a substantially incompressible fluid filling a space defined between the lower surface of the first piston and the upper surface of the second piston; and
a conduit connecting a space defined between the lower surface of the first piston and the first unit to a space defined between the second unit and the upper surface of the second piston.

14. The spring assembly of claim 13, further comprising a third piston located within the second unit.

15. The spring assembly of claim 14, further comprising a second spring attached to the third piston.

16. The spring assembly of claim 15, wherein a lower surface of the third piston is spaced apart from and faces the upper surface of the second piston; the fluid filling the spaced defined between the lower surface of the third piston and the upper surface of the second piston.

17. A spring assembly comprising:
a housing comprising a first unit and a separate second unit;
a first piston located within the first unit of the housing and having a lower surface with a first surface area;
a second piston located within the second unit of the housing and having an upper surface with a second surface area, wherein the surface area of the second piston is at least twice as large as the surface area of the first piston and the upper surface of the second piston is spaced apart from and facing the lower surface of the first piston;
a spring attached to a lower surface of the second piston; and
a substantially incompressible fluid filling a space defined between the lower surface of the first piston and the upper surface of the second piston.

* * * * *